(12) United States Patent
Engel et al.

(10) Patent No.: US 8,154,400 B2
(45) Date of Patent: Apr. 10, 2012

(54) SYSTEM COMPRISING A PLURALITY OF ELECTRICAL SWITCHES, ESPECIALLY FOR A MAGNETIC LEVITATION RAILWAY LINE

(75) Inventors: Markus Engel, Nürnberg (DE); Harald Karl, Fürth (DE)

(73) Assignee: Siemens AG, Munich (DE)

( * ) Notice: Subject to any disclaimer, the term of this patent is extended or adjusted under 35 U.S.C. 154(b) by 612 days.

(21) Appl. No.: 12/302,905

(22) PCT Filed: May 31, 2006

(86) PCT No.: PCT/DE2006/000969
§ 371 (c)(1),
(2), (4) Date: Dec. 1, 2008

(87) PCT Pub. No.: WO2007/137536
PCT Pub. Date: Dec. 6, 2007

(65) Prior Publication Data
US 2009/0243789 A1  Oct. 1, 2009

(51) Int. Cl.
*G08B 1/08* (2006.01)
(52) U.S. Cl. ......... 340/538; 340/3.5; 340/507; 324/528; 714/712
(58) Field of Classification Search .......... 340/538, 340/3.1, 507; 104/284, 27, 28, 289; 49/31; 310/12, 13; 318/135; 714/712
See application file for complete search history.

(56) References Cited

U.S. PATENT DOCUMENTS

| | | | | |
|---|---|---|---|---|
| 5,053,654 A | * | 10/1991 | Augsburger et al. | 310/12.09 |
| 6,087,790 A | * | 7/2000 | Fischperer | 318/135 |
| 6,411,049 B1 | | 6/2002 | Fischperer | |
| 6,904,549 B2 | | 6/2005 | Jurisch et al. | |
| 7,533,616 B2 | * | 5/2009 | Hahn et al. | 104/284 |
| 7,637,214 B2 | * | 12/2009 | Beck et al. | 104/284 |
| 7,677,178 B2 | * | 3/2010 | Ellmann et al. | 104/28 |
| 2004/0078710 A1 | | 4/2004 | Jurisch et al. | |

FOREIGN PATENT DOCUMENTS

| | | |
|---|---|---|
| DE | 10139318 A1 | 2/2003 |
| EP | 1050427 A2 | 11/2000 |
| JP | 63167603 A | 7/1988 |
| JP | 2003153431 A | 5/2003 |
| JP | 2005117302 A | 4/2005 |

OTHER PUBLICATIONS

International Search Report dated Feb. 13, 2007.

* cited by examiner

*Primary Examiner* — Toan N Pham
(74) *Attorney, Agent, or Firm* — Laurence A. Greenberg; Werner H. Stemer; Ralph E. Locher

(57) ABSTRACT

A system includes a plurality of electrical switches. Every switch is associated with at least one monitoring device for detecting the respective switching condition of the switch. All of the monitoring devices are interconnected through a data connection through which the switching conditions of all of the switches are made known to every monitoring device.

6 Claims, 4 Drawing Sheets

SYSTEM COMPRISING A PLURALITY OF ELECTRICAL SWITCHES, ESPECIALLY FOR A MAGNETIC LEVITATION RAILWAY LINE

BACKGROUND OF THE INVENTION

Field of the Invention

The invention relates to a system having a multiplicity of electrical switches.

In the field of railways, in particular in the field of magnetic levitation railways, efforts are made to select the signal headways of the vehicles to be as small as possible, in order to achieve maximum throughput of the vehicles on the line. Minimum signal headways can be achieved in the field of magnetic levitation railways by a so-called region overlap being permitted. In this case, a region overlap is to be understood to mean that, under certain predefined boundary conditions, two or more vehicles are allowed to move within one and the same drive or operation control region. However, this has the disadvantage that two vehicles which move in one and the same drive or operation control region can influence one another in an undesired manner under certain circumstances, specifically when two stator sections are switched on at the same time within a motor system.

However, even when only a single vehicle moves in a drive or operation control region in each case, it is fundamentally disadvantageous when two stator sections are switched on at the same time. Simultaneous operation of two stator sections can lead, specifically in an extremely unfavorable situation, to one side of the vehicle disengaging and/or to the respectively next stop not being reached. Both fault events are undesired since they can drastically disturb the operational procedure. Care should therefore be taken to very reliably prevent more than one stator section of a motor system being switched on.

BRIEF SUMMARY OF THE INVENTION

The invention is accordingly based on the object of specifying a system comprising a plurality of electrical switches, in which undesired switching states can be reliably prevented.

This object is achieved, according to the invention, by a system having a multiplicity of electrical switches, in which each switch is associated in each case with at least one monitoring device for detecting the respective switching state of the switch, and all of the monitoring devices are interconnected by a data connection through which the switching states of all of the switches are disclosed to each monitoring device. Advantageous refinements of the system according to the invention are specified in the subclaims.

Accordingly, provision is made, according to the invention, for each switch of the system to have in each case at least one associated monitoring device for detecting the respective switching state of the switch. In addition, all the monitoring devices are interconnected by a data connection via which the switching states of all the switches are disclosed to each monitoring device in each case.

A significant advantage of the system according to the invention is that of it being possible to very reliably identify faulty states since each switch has an associated monitoring device and since the data connection between the individual monitoring devices ensures that all the monitoring devices can know not only their "own" switching states but also those of all the other switches and can report faults if necessary.

As already mentioned above, the problem exists, in particular in the field of magnetic levitation railways, of avoiding undesired switching states in order to ensure a reliable operational procedure even in the event of a large vehicle throughput.

Accordingly, it is considered advantageous when the system forms a constituent part of a magnetic levitation railway line or a magnetic levitation railway line section comprising a plurality of stator sections, with each feed location of each stator section being provided with a feed switch and each star point location of each stator section being provided in each case with a star point switch. In this case, each feed switch and each star point switch preferably have in each case at least one associated monitoring device. A significant advantage of this refinement of the system is that it is possible to reliably prevent two stator sections of one and the same motor system being switched on at the same time since the switching states of all the switches of the system are continuously monitored.

A particularly high degree of reliability can be achieved in a particularly simple and therefore advantageous manner when each switch is connected in each case to at least two monitoring devices. A redundant design such as this ensures that, even in the case of breakdown of a monitoring device, in each case at least one further monitoring device is able to detect and correspondingly display or stop an unfavorable switching state.

With a view to designing the system to be as simple as possible, it is considered advantageous when each monitoring device is connected in each case to at least two switches which belong to different, preferably adjoining, stator sections. In this refinement of the system, account is taken of the fact that successive stator sections directly adjoin one another in the field of magnetic levitation railways, and so at least two switches, for example a star point switch of one stator section and a feed switch of the respectively adjacent stator section, can be monitored with minimum outlay by one and the same monitoring device.

With a view to transmitting data without interference and in a reliable manner as far as possible, the data connection preferably comprises at least one data transmission ring which connects all the monitoring devices to one another. A data transmission ring has, specifically on account of its ring structure, the advantage that the data connection cannot be interrupted even when the data transmission ring is interrupted at one location; this is because, on account of the ring structure, the monitoring devices remain connected even over the "open restring" in the event of ring interruption.

A particularly high degree of data security is achieved when the data connection comprises two redundantly operating data transmission rings which in each case connect all the monitoring devices to one another. In a case such as this, one of the two data transmission rings can breakdown completely, without this leading to an interruption of the data connection, since the data connection can be maintained by means of the respectively other, still operating data transmission ring.

The invention also relates to a method for controlling a magnetic levitation railway line or a magnetic levitation railway line section comprising at least two stator sections.

In order to ensure that a plurality of stator sections cannot be undesirably switched on at the same time in the case of such a method, provision is made, according to the invention, for each stator section of the magnetic levitation railway line section, for the switch position of the feed switch of the respective stator section and the switch position of the star point switch of the respective stator section to be monitored by, for example, monitoring devices which are related to the stator section. The switching states in all the other stator sections are additionally also transmitted to all the monitoring devices in each case, so that a check can be made with each monitoring device to determine whether there is an impermissible operating state, in particular in the respectively associated stator section, or not. At least one feed switch or at least one star point switch is switched off by the respectively associated monitoring device when an impermissible operating state is identified in at least one stator section.

In this case, the impermissible operating states considered are all feasible process states which are undesired, be they, for example, the case mentioned initially of two stator sections being switched on at the same time within one motor system, or else other interference states such as excess temperature, excess current, excess voltage or launching of a fault recorder function.

Reference may be made to the above embodiments in connection with the system according to the invention with regard to the advantages of the method according to the invention.

It is considered particularly advantageous when a check is made with the monitoring devices to determine whether two or more stator sections of the magnetic levitation railway line are switched on at the same time, and when individual or all of the affected stator sections are switched off in such a case.

The invention is explained in greater detail below with reference to exemplary embodiments; in the drawing and by way of example

DESCRIPTION OF THE INVENTION

For reasons of clarity, the same reference symbols are always used for identical or comparable components in FIGS. 1 to 5.

Figure 1:
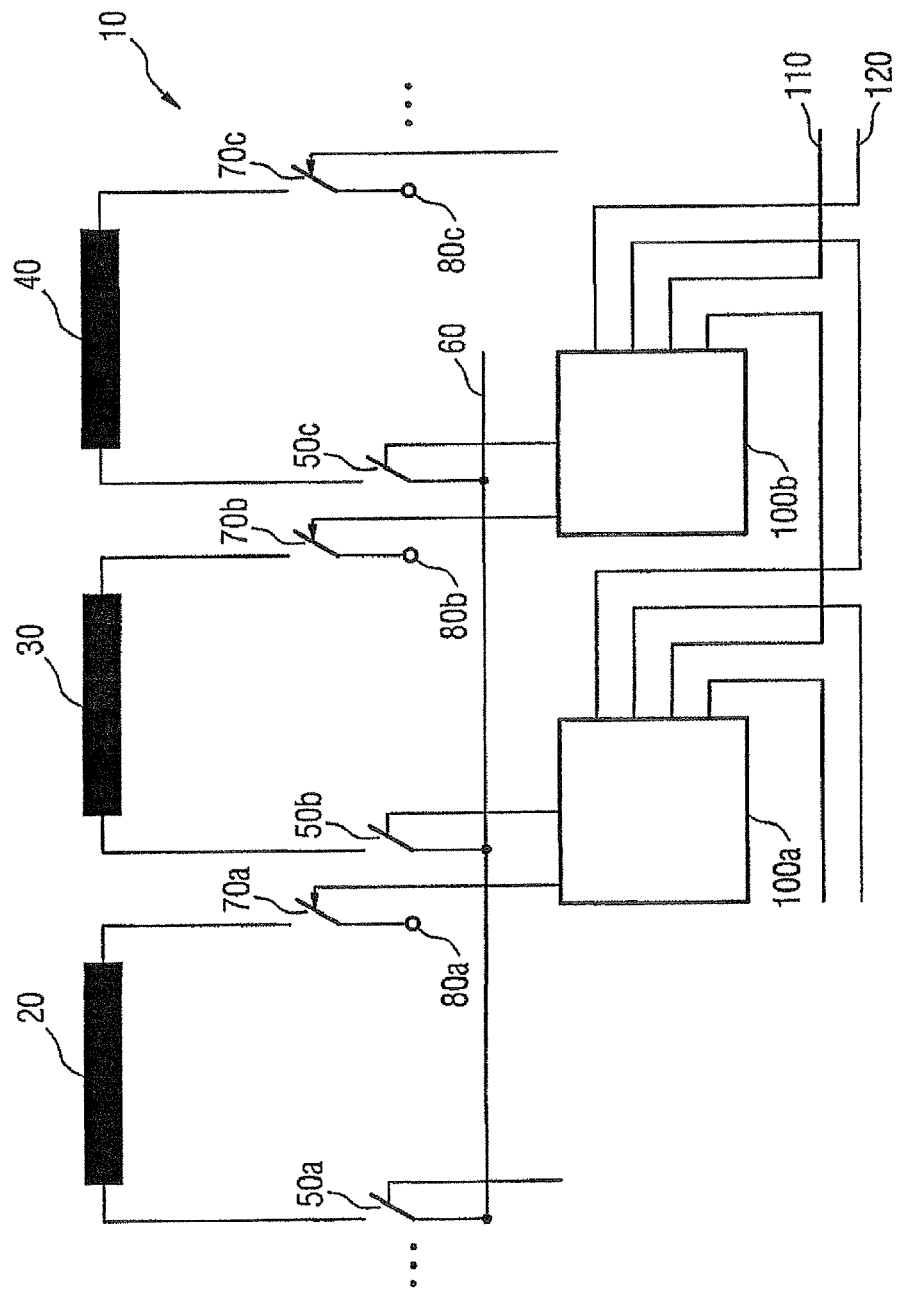
FIG. 1 shows an exemplary embodiment of a system according to the invention which forms a constituent part of a magnetic levitation railway line comprising a plurality of stator sections.

FIG. 1 shows an exemplary embodiment of a system 10 which forms a constituent part of a section of a magnetic levitation railway line. The system 10 has a plurality of stator sections, with only three of these stator sections being illustrated in FIG. 1 for reasons of clarity. Said stator sections are provided with reference symbols 20, 30 and 40.

Each of the stator sections 20, 30 and 40 is connected in each case to a feed switch 50a, 50b or 50c with which an electrical connection can be established between the respective stator section and a line cable 60.

Each of the stator sections 20, 30 and 40 is also connected to a star point switch 70a, 70b or 70c with which a connection can be established between the respective stator section and the associated star point 80a, 80b or 80c. For this purpose, the star point switches 70a, 70b, 70c are in each case of three-phase design, but this is not illustrated any further in FIG. 1.

FIG. 1 shows that the star point switches and the feed switches are monitored by a plurality of monitoring devices, two of these monitoring devices being shown in FIG. 1. The two monitoring devices are identified by reference symbols 100a and 100b.

The monitoring device 100a is arranged positioned on the transition or coupling location between the two stator sections 20 and 30 and is electrically connected to the star point switch 80a of the stator section 20 and to the feed switch 50b of the stator section 30.

In a corresponding manner, the monitoring device 100b is arranged positioned in the region of the transition or coupling location between the stator sections 30 and 40; said monitoring device is electrically connected to the feed switch 50c of the stator section 40 and to the star point switch 70b of the stator section 30, in order to control and monitor these switches.

FIG. 1 also shows that the monitoring devices 100a and 100b and all further monitoring devices which are associated with the stator sections of the magnetic levitation railway line are connected to one another so as to transmit data by means of two data transmission rings. One of the two data transmission rings is provided with reference sign 110 in FIG. 1 and the second data transmission ring is provided with the reference sign 120. The two data transmission rings 110 and 120 are preferably of identical design and operate in a comparable manner.

The system according to FIG. 1 can operate as follows:

In order to control a vehicle which moves on one of the stator sections 20, 30 or 40, the corresponding feed switches 50a, 50b and 50c and the corresponding star point switches 70a, 70b and 70c are switched on or switched off. It is ensured in the process that in each case only one of the stator sections 20, 30 or 40 is switched on; the other stator sections remain switched off. In order to ensure such a switching state, the monitoring devices are designed in such a way that they always switch on only one of the stator sections, specifically the stator section respectively required for driving the vehicle, and switch off the other stator sections. In this case, the two data transmission rings 110 and 120 permit each of the monitoring devices to be informed about the switching state of all the switches of the system 10, so that each monitoring device is autonomously able to decide whether the respectively associated switches have to be switched on or off.

Even when one of the two data transmission rings 110 and 120 is interrupted, the redundancy nevertheless ensures that all the monitoring devices are informed about the respective switching state of all the other switches of the system 10, since the respectively other data transmission ring is still available for data transmission and remains operative.

Only one single monitoring device is shown for each of the switches of the system 10 in FIG. 1 for reasons of clarity. However, a particularly high degree of redundancy can be achieved when each of the switches has at least two or more associated monitoring devices, so that if one of the monitoring devices breaks down, all the switches of the system 10 are nevertheless still guaranteed to be in the correct switching states.

In any case, a central control system to which the monitoring devices send their reports and which monitors and/or controls the monitoring devices can also be connected to the data transmission ring(s) 110 and/or 120. One of the monitoring devices of the system 10 can be integrated, for example, in a central control system of this type; as an alternative, the central control system can also be contained in one of the monitoring devices.

Figure 2:
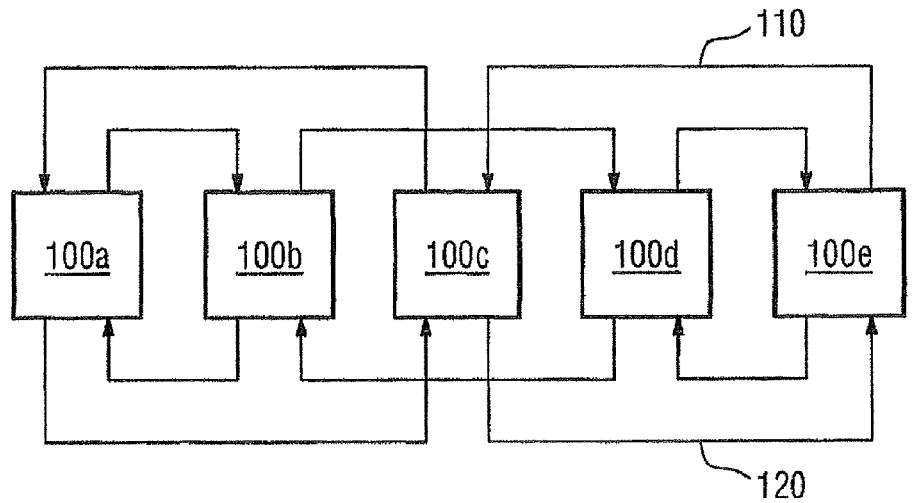
FIG. 2 shows, in detail, the data connection between monitoring devices of the system according to FIG. 1.

In FIG. 2, the ring structure of the two data transmission rings 110 and 120 is once again shown in greater detail. Said figure shows a plurality of monitoring devices, namely the monitoring devices 100a and 100b according to FIG. 1 and, by way of example, further monitoring devices which are identified by reference symbols 100c, 100d and 100e. All of these monitoring devices are also interconnected both via the first data transmission ring 110 and via the second data transmission ring 120 in order to ensure fail-safe data transmission.

Figure 3:
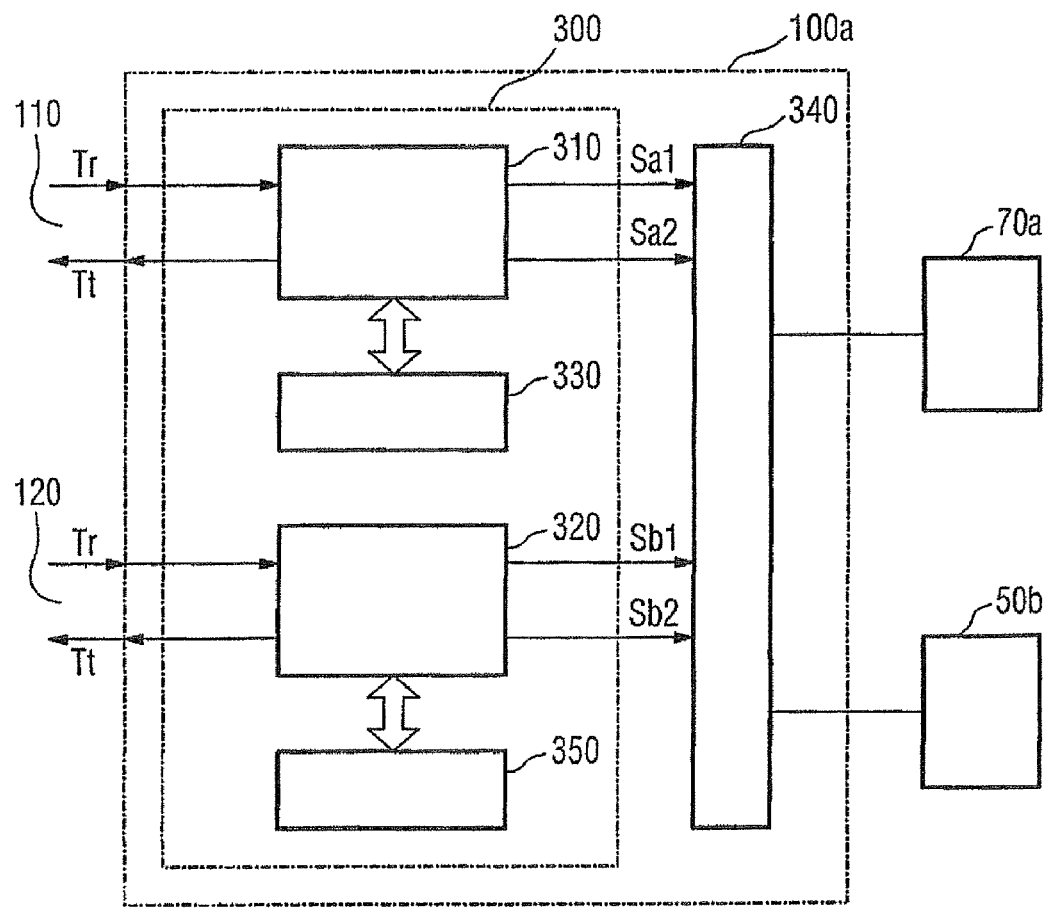
FIG. 3 shows an exemplary embodiment of the design of a monitoring device for the system according to FIG. 1.

FIG. 3 shows an exemplary embodiment of the monitoring device 100a according to FIG. 1 or FIG. 2 in greater detail. Said figure shows a control device 300 which has two control modules 310 and 320.

One of the two control modules 310 is connected to the first data transmission ring 110 and evaluates the data telegrams Tr which arrive at the input end and are delivered by the other monitoring devices. For this purpose, the control module 310 accesses an associated program module 330 in which the corresponding software and firmware for controlling the control module 310 is stored. The control module 310 then analyzes the switching states of the other switches delivered by the other monitoring devices and, in accordance with the prespecifications of the program module 330, decides whether one or both of the associated switches, that is to say the star point switch 70a or the feed switch 50b, have to be opened in order to avoid an impermissible switching state.

If the control module 310 makes a switch-off decision of this type, it produces, at the output end, a corresponding switch-off signal Sa1 or Sa2 and transmits this signal to a switching device 340 of the monitoring device 100a. The task of the switching device 340 is that of switching off the star point switch 70a when the switch-off signal Sa1 is applied to the input end, and to switch off the feed switch 50b when the switch-off signal Sa2 is applied to the input end.

The two switches 50b and 70a are schematically illustrated in FIG. 3 only as blocks which are connected to the switching device 340 of the monitoring device 100a.

The control module 320 of the control device 300 also operates like the control module 310. This means that it evaluates the data telegrams Tr of the second data transmission ring 120 which are applied to the input end and, using a program module 350 which is connected to the control module 320, decides whether corresponding switch-off signals Sb1 or Sb2 have to be generated for the purpose of switching off the star point switch 70a or the feed switch 50b. If this is the case, the corresponding signals Sb1 and Sb2 are transmitted to the switching device 340 which, at the output end, then causes the corresponding changeover of the switch in question.

Furthermore, the two control modules 310 and 320 have the task of informing the other monitoring devices of the system 10 according to FIG. 1 about the switching states of the switches 70a and 50b which are associated with them. In order to ensure this, the control modules 310 and 320 insert the information which relates to their associated switches 50b and 70a into the incoming data telegrams Tr and send this information at the output end to the other monitoring devices via their respectively associated data transmission ring 110 and 120.

Figure 4:
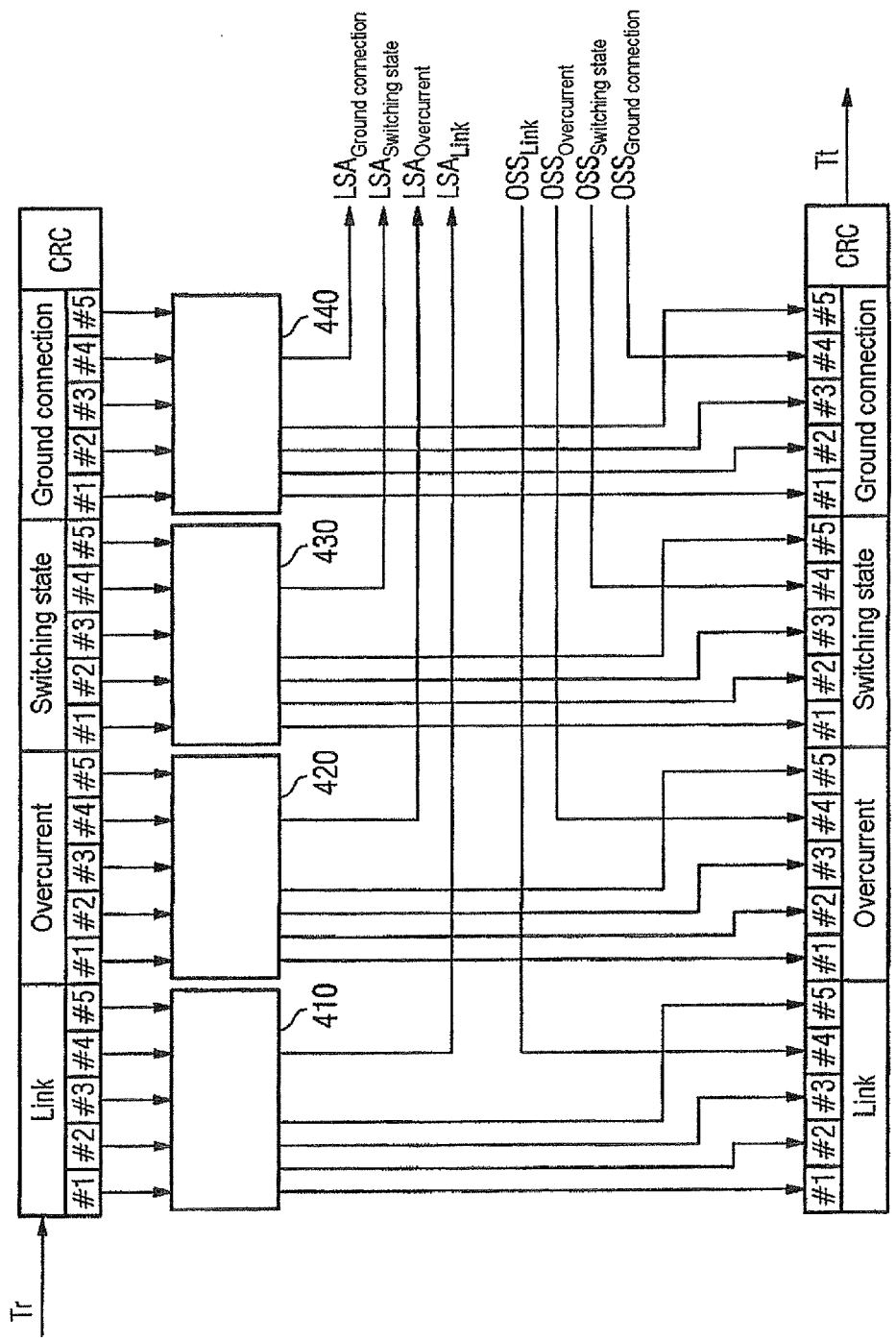
FIG. 4 shows an exemplary embodiment for a telegram structure for data transmission between the monitoring devices in the system according to FIG. 1 and the further processing of said telegram structure within the monitoring devices.

FIG. 4 schematically illustrates how evaluation and forwarding of telegrams may, for example, look in the two control modules 310 and 320. The content of the incoming data telegram Tr is examined in analysis blocks 410, 420, 430 and 440.

In FIG. 4, it is assumed, by way of example, that incoming data telegrams Tr and outgoing data telegrams Tt can in each case contain a total of four independent information blocks: one of the information blocks is identified by the words "Ground connection"; this information block has the task of identifying any ground connections in the system 10 according to FIG. 1. A further information block, which is designated by the term "Switching state", indicates how the switching states of the individual switches of the system according to FIG. 1 look. A third information block is identified by the word "Overcurrent" and indicates when an overcurrent occurs in the system 10 according to FIG. 1. Information which relates to the data transmission ring 110 or 120 according to FIG. 1 is transmitted in the information block "Link".

The analysis blocks 410, 420, 430 and 440 analyze the corresponding information sections of the received data telegram Tr and generate corresponding control signals $LSA_{Ground\ connection}$, $LSA_{Switching\ state}$/$LSA_{Overcurrent}$, $LSA_{Link}$ which are transmitted, for example, to the switching device 340.

Furthermore, the analysis blocks 410, 420, 430 and 440 are suitable for generating, at the output end, data telegrams Tt which are forwarded to the other monitoring devices via the respectively associated data transmission ring 110 or 120.

When generating the output data telegrams Tt, the analysis blocks 410, 420, 430 and 440 take into account the respective state of their stator section, for example with regard to the switching states of the associated switches 50b and 70a and with regard to the other states which may be relevant to the other monitoring devices, in the process. Corresponding control information $OSS_{Ground\ connection}$/$OSS_{Switching\ state}$/$OSS_{Overcurrent}$, $OSS_{Link}$ is incorporated in the incoming data telegrams Tt, as is schematically shown in FIG. 4.

Figure 5:
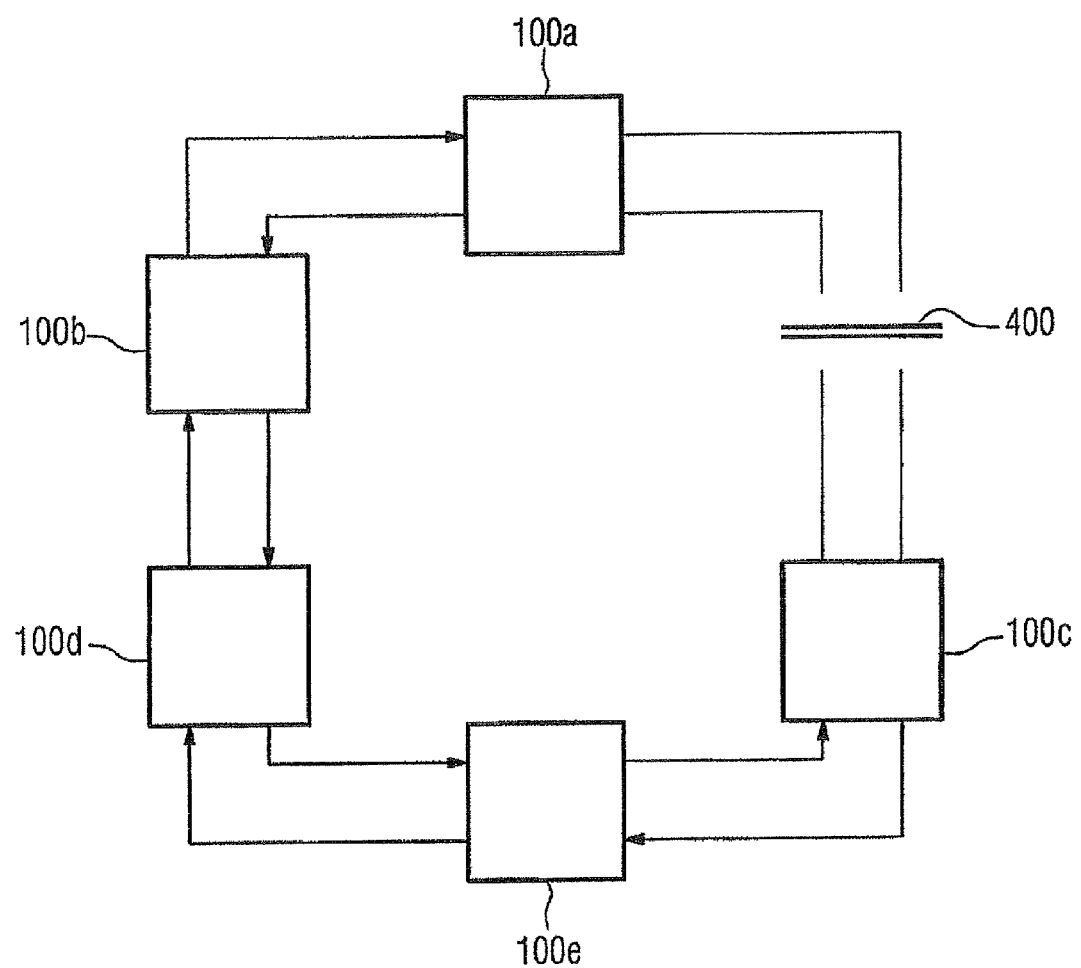
FIG. 5 shows an exemplary embodiment of data transmission in the case of interruption of the data transmission rings which connect the monitoring devices according to FIG. 1.

FIG. 5 illustrates, by way example, that data transmission between the individual monitoring devices is still possible even in the event of an interruption in the two data transmission rings 110 and 120 according to FIG. 2 if the two rings are operated with different data transmission directions.

In the case of an opposite transmission direction, it is still possible, specifically even in the case of a ring interruption 400 which occurs in FIG. 5, by way of example, between the monitoring devices 110a and 100c, to transmit data telegrams from each monitoring device to every other monitoring device. As an alternative, the two data transmission rings can also operate in a bidirectional manner in order to prevent transmission interference.

LIST OF REFERENCE SYMBOLS

10 System
20, 30, 40 Stator sections
50a, 50b, 50c Feed switches
60 Line cable
70a, 70b, 70c Star point switches
80a, 80b, 80c Star points
100a, 100b Monitoring devices
100c, 100d Monitoring devices
100e Monitoring device
110, 120 Data transmission rings
300 Control device
310, 320 Control modules
330 Program module
340 Switching device
350 Program module
410, 420 Analysis blocks
430, 440 Analysis blocks
Sa1, Sa2 Switch-off signals
Sb1, Sb2 Switch-off signals Tt Data telegrams
Tr Data telegram

The invention claimed is:

1. A magnetic levitation railway line section, comprising:
a plurality of stator sections each including a feed location each having an electrical feed switch and a star point location each having an electrical star point switch;
at least one monitoring device associated with each respective one of said electrical feed switches and electrical star point switches and connected to at least two respective switches belonging to different stator sections, for detecting a respective switching state of said respective one of said electrical switches; and
a data connection interconnecting each of said at least one monitoring device for disclosing said switching states of all of said electrical switches to said at least one monitoring device.

2. The line section according to claim 1, wherein said different stator sections are adjoining stator sections.

3. The line section according to claim 1, wherein said data connection includes at least one data ring interconnecting said at least one monitoring device.

4. The line section according to claim 1, wherein said data connection includes two redundantly operating data rings each interconnecting each of said at least one monitoring device.

5. A system, comprising:
a multiplicity of electrical switches;
at least one monitoring device associated with each respective one of said electrical switches for detecting a respective switching state of said respective one of said electrical switches;
each of said switches being connected to at least two monitoring devices; and
a data connection interconnecting each of said at least one monitoring device for disclosing said switching states of all of said electrical switches to said at least one monitoring device.

6. A method for controlling a magnetic levitation railway line section, the method comprising the following steps:
providing at least two stator sections each having a feed switch and a star point switch with switching positions defining switching states;
monitoring the switching position of the feed switch and the switching position of the star point switch with at least one monitoring device for each respective one of the stator sections;
transmitting the switching states of the feed switches and the star point switches of all of the stator sections to each of the at least one monitoring device;
checking, with each monitoring device, to determine a presence of an impermissible operating state in a respectively associated stator section;
switching off at least one of at least one feed switch or at least one star point switch with a respectively associated monitoring device upon identifying an impermissible operating state in at least one of the stator sections; and
checking, with each of the at least one monitoring device, to determine if two or more of the stator sections are switched on at the same time, and if so switching off individual or all affected stator sections.

* * * * *